Feb. 4, 1969  R. R. ROBINSON  3,425,411
INTRA-UTERINE DEVICE
Filed May 19, 1966
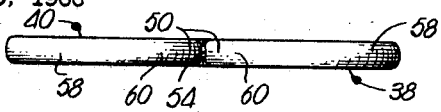
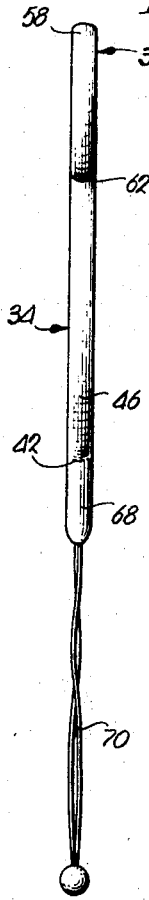
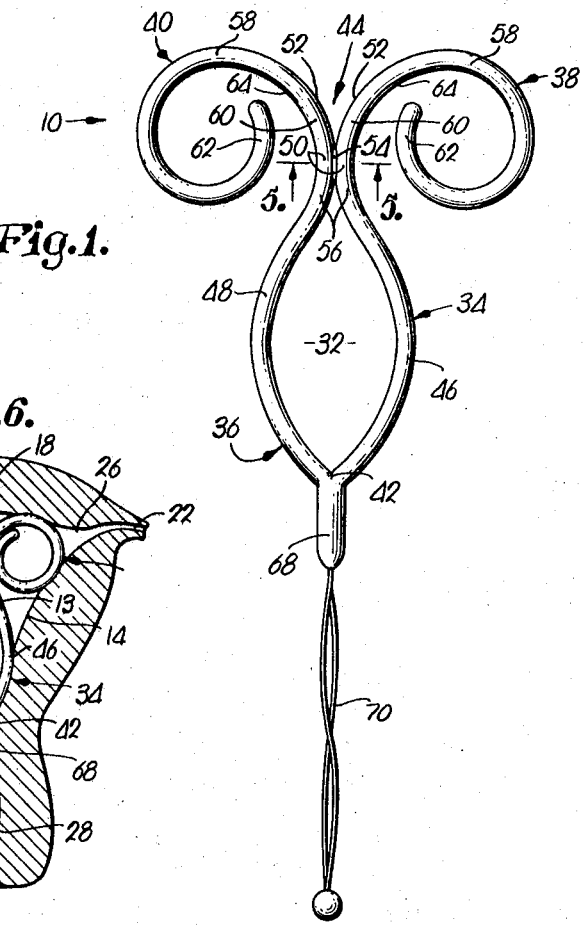
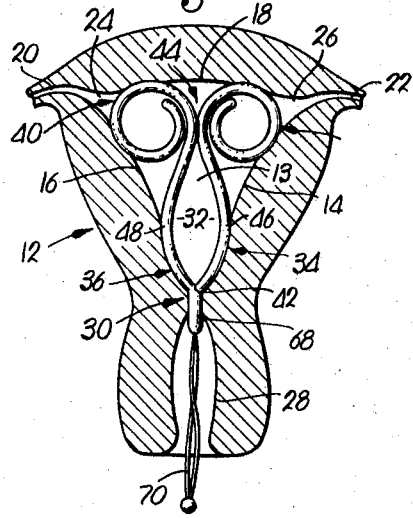
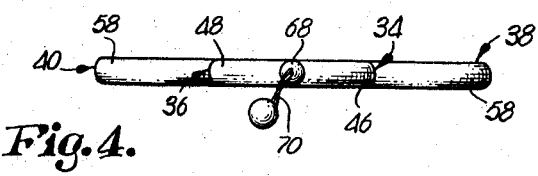
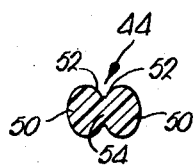
INVENTOR
Ralph R. Robinson
BY
*Hovey, Schmidt, Johnson & Hovey*
ATTORNEYS.

United States Patent Office 3,425,411
Patented Feb. 4, 1969

3,425,411
INTRA-UTERINE DEVICE
Ralph R. Robinson, 2024½ Cumberland Ave.,
Middlesboro, Ky. 40965
Continuation-in-part of application Ser. No. 489,693,
Sept. 23, 1965. This application May 19, 1966, Ser.
No. 551,414
U.S. Cl. 128—130     7 Claims
Int. Cl. A61f 5/46; A61m 31/00

ABSTRACT OF THE DISCLOSURE

An intra-uterine contraceptive device has an elongated loop which elongates during contraction of the uterine walls, increasing the area of surface contact to resist expulsion. Such elongation of the loop spreads a pair of elements into tight seating relationship to the mouths of the fallopian tubes, thereby resisting expulsion still further. Concave arms complementally receive a convolution of each element in nested relationship thereto during inward flexing of the concavo-convex arches of the loop.

---

This is a continuation-in-part of my copending application Ser. No. 489,693, filed Sept. 23, 1965, now Patent No. 3,291,125 and entitled, Pessary.

This invention relates to the field of intra-uterine contraceptives, having as its primary object the provision of a device which cannot be expelled from the uterus by uterine contractions and which is free from irritation and discomfort factors.

It is one of the most important objects of the instant invention to provide an intra-uterine device having substantial surface areas for uterus wall-engaging purposes strategically disposed for maximum effectiveness during contraction of the uterus in an effort to make sure that the expulsion of the device from the uterus during such contractions is fully impeded.

As a corollary to the foregoing object, the present invention provides a device having a pliable, yet resilient loop extending transversely across the cirvical mouth of the uterus and complementally engaging the walls of the latter to the end that, as uterine contractions occur, the loop will be flexed inwardly and present additional surface area for engagement by the uterine walls.

A very important object of the present invention is to provide a device in the nature of that disclosed in my Patent No. 3,234,938, issued Feb. 15, 1966, and entitled "Intra-Uterine U Stem Pessary," with the addition in the instant invention of a properly formed resilient loop cooperating with novel fallopian tube engaging elements to provide additional zones of contact between the device and the uterus walls uniquely disposed to fulfill the aforesaid objects of comfort and nonexpulsion.

Another object of my present invention is the provision of a device wherein said loop thereof is integrally continuous so that improper and undesirable lateral deformation is minimized.

In the drawing:

FIGURE 1 is a front elevational view of an intra-uterine device which embodies the principles of the present invention;

FIG. 2 is a side elevational view thereof;
FIG. 3 is a top plan view thereof;
FIG. 4 is a bottom plan view thereof;
FIG. 5 is an enlarged, cross-sectional, detail view taken along line 5—5 of FIG. 1; and
FIG. 6 is a view similar to FIG. 1 on reduced scale illustrating the device contracted within the uterus.

Device 10 is constructed of a resilient, yet pliable, material such as plastic and is designed for insertion into the uterus 12 by tubular means as described in my above referenced patent. The uterine cavity 13 is defined by uterine walls 14, 16 and 18. Fallopian tubes 20 and 22 communicate with the cavity 13 and each tube 20 and 22 presents a mouth 24 and 26, respectively, at the zone of communication. The cervix 28 likewise communicates with the cavity 13, and a uterus mouth 30 is presented therebetween.

Device 10 comprises an elongated loop 32 having convex outermost surfaces 34 and 36 adapted to complementally engage walls 14 and 16 respectively of the uterus adjacent the uterus mouth 30, and a pair of elements 38 and 40. Loop 32 has a horizontal, transverse axis spanning the distance across the uterus 12 above the mouth 30 and a vertical, longitudinal axis extending upwardly away from mouth 30. Loop 32 presents a lower vertex 42 for engaging the walls 14 and 16 in mouth 30, and an upper vertex 44 within the uterine cavity 13 and spaced inwardly from uterine walls 14, 16 and 18. Elements 38 and 40 extend laterally in opposite directions from the vertex 44 with the element 38 engaging uterine walls 14 and 18 within the fallopian tube mouth 26 and the element 40 engaging uterine walls 16 and 18 within the fallopian tube mouth 24.

Loop 32 has a pair of opposed, concavo-convex arches 46 and 48 which are adapted to flex inwardly toward each other in response to inward movement of uterine walls 14 and 16 caused by uterine contraction. Elements 38 and 40 have elongated, inwardly bowed arms 50 which abut and are interconnected at their convex sides 52 intermediate the ends of the arms 50 to present a zone of abutment 54. The arms 50 each have a lower end 56 which is integral with a respective arch 46, 48 at the vertex 44. Each element 38 and 40 comprises a convolution having a portion 58 extending upwardly and laterally from the upper end 60 of the corresponding arm 50.

Each of the upwardly-bowed, outwardly-extending portions 58 has an arcuate, downwardly-bowed length 62 extending inwardly therefrom and configures to nest complementally within the concave side 64 of the corresponding arm 50.

Device 10 has centering means comprising a stem 68 integral with the loop 32 and depending from vertex 42; a tail 70 depends from the stem 68. After device 10 is inserted into the uterus 12, as is illustrated in FIG. 6, the stem 68 is disposed to extend through the mouth 30 of the uterus 12 and into the cervix 28, while the tail 70 extends through the cervix 28 and out into the vagina (not shown).

Viewing FIGS. 2, 3 and 4, it can be seen that the various components of device 10 are subsequently coplanar. This configuration is preferred because the uterine cavity 13 is substantially laterally thin and flat, and if the components of device 10 were not substantially coplanar, irritation of the uterus could result.

The various components of device 10, excepting perhaps stem 68, are preferably transversely oval with the major axis of the oval extending substantially perpendicularly to the plane of device 10. This configuration is illustrated in FIG. 5 which also illustrates the interconnection between the convex sides 52 of arms 50 at the zone of abutment 54. When device 10 is in place in uterus 12 with the surfaces 34 and 36 engaging the uterus walls 14 and 16, respectively, and with the elements 38 and 40 engaging a pair of uterus walls 14 and 18, and 16 and 18 respectively, the oval configuration of the arches 46 and 48 and of the elements 38 and 40 presents an increased surface area in contact with the uterus walls 14, 16 and 18.

FIGURE 6 illustrates the disposition of device 10 after insertion into the uterus 12. During uterine contraction, the uterus walls 14 and 16 move toward one another, and arches 46 and 48 being pliable, will be pushed toward each other, thus flattening. This action has two results, firstly, additional surface area along surfaces 34 and 36 will come into engagement with walls 14 and 16; and secondly, the longitudinal length of loop 32 will increase. Thus, vertex 44 will be moved upwardly (device 10 is held in place by loop 32) and each of the arms 50, portions 58 and lengths 62 will be shifted helically to cause the lengths 62 to nest complementally within the corresponding concave side 64 of a respective arm 50. At the same time, the angle between the sides 52 will increase, causing elements 38, 40 to seat tightly in mouths 24, 26.

As uterine contractions increase in intensity, device 10 presents more and more surface in contact with the uterine walls to resist expulsion. Additionally, viewing FIG. 6, it is apparent that each of the uterine walls 14, 16 and 18 are normally contacted at two different contact zones by device 10. Thus, the possibilities of expelling device 10 are minimized because of the maximized area of contact during contraction.

Irritation and discomfort factors have been reduced, if not eliminated, because of the large areas of uterine wall contact as distinguished from line, edge or point contact found in prior art devices. Moreover, all surfaces are smooth, arcuate and uniform, avoiding sharp and angular irritation-producing areas, protuberances, corners and the like.

Having thus described the invention, what is claimed as new and desired to be secured by Letters Patent is:

1. An intra-uterine device of flexible material comprising:
    an elongated loop having convex, outermost surfaces adapted to complementally engage the walls of the uterus at the mouth thereof,
    said loop having a transverse axis spanning the distance across the uterus inwardly of said mouth, and a longitudinal axis provided with a lower vertex for engaging the walls of the uterus in said mouth and an upper vertex within the uterus spaced inwardly from the walls of the uterus; and
    a pair of elements extending laterally in opposite directions from said upper vertex for engaging the walls of the uterus within the mouths of the fallopian tubes.

2. The invention of claim 1,
    said loop having a pair of opposed, concavo-convex arches adapted to flex inwardly toward each other, and thereby increase the length of said longitudinal axis, in response to muscular contraction,
    said elements including a pair of inwardly bowed arms integral with corresponding arches at said upper vertex.

3. The invention of claim 2,
    said arms being in abutment at their convex sides intermediate the ends thereof.

4. The invention of claim 3,
    said arms being interconnected at their zone of abutment.

5. The invention of claim 4,
    each element having an arcuate, upwardly-bowed portion extending outwardly from the upper end of the corresponding arm.

6. The invention of claim 5,
    each element having an arcuate, downwardly-bowed length extending inwardly from the corresponding portion, presenting a convolution, said length being complemental with the concave side of the corresponding arm whereby it nests therewithin in response to said muscular contraction.

7. The invention of claim 6,
    all of said components of the device being coplanar and transversely oval.

References Cited

UNITED STATES PATENTS

| | | | |
|---|---|---|---|
| 533,120 | 1/1895 | Ferguson | 128—130 |
| 982,996 | 1/1911 | Rowell | 128—130 |
| 2,176,559 | 10/1939 | Meckstroth | 128—130 |
| 3,291,125 | 12/1966 | Robinson | 128—130 |

ADELE M. EAGER, *Primary Examiner.*